Oct. 30, 1956 D. SAMIRAN 2,768,845
HIGH PRESSURE REPLACEABLE HOSE COUPLING
WITH WIRE SPRING GRIPPER
Filed March 14, 1949
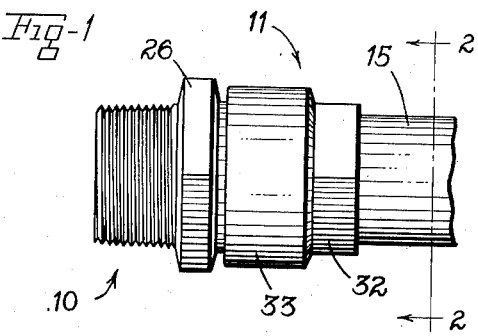
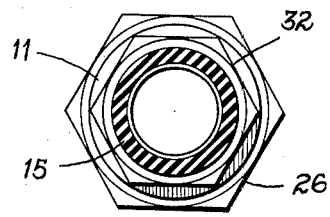
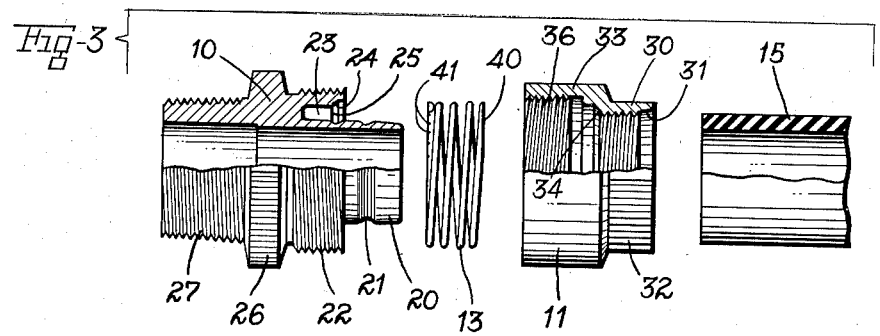
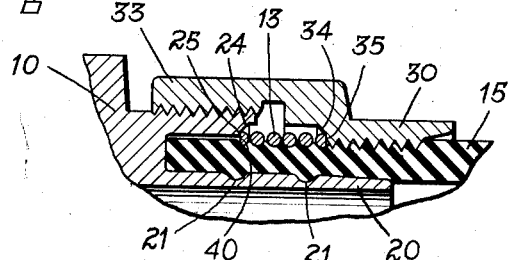
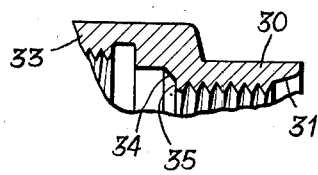
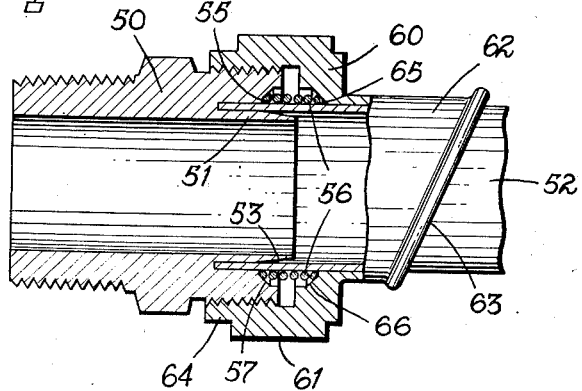
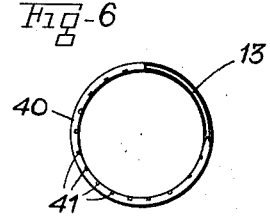
INVENTOR.
David Samiran
BY
Marechal & Biebel
ATTORNEYS United States Patent Office 2,768,845
Patented Oct. 30, 1956

2,768,845

HIGH PRESSURE REPLACEABLE HOSE COUPLING WITH WIRE SPRING GRIPPER

David Samiran, Dayton, Ohio, assignor to Bowser, Inc., Fort Wayne, Ind., a corporation of Indiana Application March 14, 1949, Serial No. 81,240

1 Claim. (Cl. 285—331)

This invention relates to a coupling or fitting adapted for use with hose and other tubing capable of handling fluids under high pressure.

One of the principal objects of the invention is to provide a coupling which is of simple and economical construction, which can be quickly and easily installed in the field without requiring special tools or other equipment, and which will assure a highly effective connection capable of withstanding high internal pressures in use.

Another object is to provide such a coupling which includes a pair of threaded members for attachment to the tubing and a spring arranged between the threaded members and cooperating therewith in such manner that as the threaded members are screwed together the spring is tightened into close gripping engagement with the tubing without wedging under either of the threaded members or otherwise tending to cause misalignment or undesirable distortion of any of the parts.

It is also an object of the invention to provide a coupling construction having the above characteristics which is equally adaptable for use with rubber hose or other flexible tubing and with rigid tubing of all-metal construction and similar thin pipe.

Other objects and advantages of the invention will be apparent from the following description, the accompanying drawing and the appended claim.

In the drawing—

Fig. 1 is a view in side elevation showing a coupling unit in accordance with the invention installed on the end of a rubber hose;

Fig. 2 is a transverse section on the line 2—2 of Fig. 1;

Fig. 3 is an exploded view, partly in elevation and partly in section, of the coupling of Fig. 1;

Fif. 4 is a fragmentary view of the assembled coupling on an enlarged scale;

Fig. 5 is a similarly enlarged fragmentary view of the collar member of the coupling;

Fig. 6 is a view in end elevation of the helical spring member of the coupling; and Fig. 7 is a view partly in elevation and partly in section of another form of coupling mounted on a thin walled metal tube.

Referring to the drawing, which illustrates preferred embodiments of the present invention, Figs 1 to 6 show a coupling unit constructed for use with flexible tubing such as reinforced rubber hose of the type commonly employed for handling fluids under high pressure. This coupling includes three component parts—a nipple 10, a collar 11 and helical spring 13, the construction and operation of this unit being illustrated in connection with a hose 15 shown as formed of rubber for simplicity of illustration.

The nipple 10 includes a portion 20 of such diameter as to be forcibly receivable within the hose 15, and the outer surface of this portion 20 is provided with cirmumferential grooves 21 for receiving the flexible material of the hose to assure a tight fit. The nipple 10 also includes a portion 22 concentric with the portion 20 and shorter axially than this portion 20 but of larger diameter to form therewith an annular recess 23 for receiving the end of the hose, and the outer surface of the portion 22 is threaded for engagement with a complementary threaded portion of the collar 11. The outer end of this nipple portion 22 has a tapered surface portion 24 which terminates in a transverse annular shoulder 25 at the outer end of the recess 23. The nipple 10 also includes portion 26 of hexagonal or other suitable shape to receive a wrench, and the end portion 27 of the nipple is threaded for engagement with a threaded female portion of a complementary coupling unit.

The collar 11 includes a portion 30 of such inner diameter as to have close fitting engagement with the outer surface of the hose 15. This portion 30 is internally threaded to grip the hose and is tapered outwardly at 31 to facilitate initial mounting on the hose, and the outer surface 32 of collar portion 30 is hexagonal or otherwise suitable shaped to receive a wrench. The portion 33 of collar 11 is of larger inner diameter than the outer diameter of the hose to form therewith an annular space when mounted on the hose for receiving the spring 13, and at the inner end of this space, the part 33 has a tapered surface portion 34 which is similar to the surface 24 in nipple 10, and which terminates in a transverse annular shoulder 35 similar to the shoulder 25 on the nipple. The collar portion 33 is also provided with internal threads 36 for engagement with the threaded portion 22 of nipple 10.

In assembling this coupling unit on hose 15, the collar 11 is first mounted on the hose, as by screwing the collar on the hose by hand, and then the spring 13 is forced on the hose. This spring is of such size as to fit fairly tightly over the hose when not under tension or compression, application thereof is facilitated by twisting the spring in the direction to unwind it during the time it is being pressed on the end of the hose. The nipple 10 is then fitted on the end of the hose, which is forced over the nipple portion 20 until it is substantially fully seated within the recess 23. After the nipple is in place, the collar 11 is moved into contact with it, and the threaded portions 33 and 22 of these parts are screwed together, which in turn causes the spring 13 to be compressed axially between the collar and nipple.

It will be noted that the spring 13 is wound in a left-hand spiral, which is the reverse of the normal direction of the threads on the portions 22 and 33 of the nipple and collar, and thus as these parts are screwed together, the effect is to tighten the spring and thus to increase its grip on the hose against the nipple portion 20. During this operation, the tapered surfaces 24 and 34 act to cam the ends of the spring against the hose, but since the ends of the spring seat on the shoulders 25 and 35, they are prevented from wedging inwardly between the outer surface of the hose and either the collar or nipple, thus assuring a uniformly tight gripping of the hose between the spring and the nipple portion 20 along substantially the entire length of the spring in its compressed position. It will also be noted that the outer ends of the spring are flattened at 40 to assure the desired seating of the spring on the shoulders 25 and 35, and the cooperating action of these parts may also be facilitated by roughening the spring ends, as by rough grinding the wire of the spring to produce the flats at 40, and by notching these flats as indicated at 41 in Figs. 3 and 6 to minimize slippage between the spring and shoulders during assembly of the unit.

Fig. 7 shows a coupling similar to that just described which is particularly adapted for use with thin walled pipe such as aluminum or copper tubing and the like. In this coupling, the nipple 50 is similar to the nipple 10, but its inner part 51 which fits within the tubing 52 has a smooth outer surface which is slightly tapered at 53 to facilitate entry into the tubing. The threaded portion 54 of nipple 50 which is concentric with the portion 51 is provided with a transverse annular shoulder 55 at its outer end to serve as a seat for the helical spring 56, and this shoulder has a tapered portion 57 extending from it to the outer end of the nipple.

The collar 60 in Fig. 7 includes a hexagonal portion 61 and a sleeve portion 62 adapted for smoothly fitting engagement with the tubing 52. The outer end of sleeve portion 62 is slightly flared at 63 to form a bead facilitating initial mounting on the tube, and it will be noted that the end of this sleeve portion is arranged at an angle to the axis of the tubing to distribute the stress thereon and avoid crystallization of the tube along a single line in use. The portion 64 of collar 60 is of larger inner diameter than the outer diameter of the tubing 52 and is threaded to engage the nipple portion 54. The collar portion 64 is also formed with an internal shoulder 65 similar to the shoulder 35 in collar 11 and similarly provided with an adjacent tapered surface portion 66.

The operation of this form of coupling is similar to that already described in connection with Figs. 1 to 6. The collar 60 and spring 56 are first slipped over the tubing 52, and the portion 51 of nipple 50 is then inserted in the end of the tube until the latter is firmly seated in the recess between the nipple portions 51 and 54. Then as the collar and nipple are screwed together, the spring 56 is compressed axially between the shoulders 55 and 65 and is wound up increasingly tightly against the tubing 52. In practice it has been found that the spring will actually bite into the outer surface of the tubing even when the latter is formed of a relatively hard material such as aluminum, so as to give a positive lock on the tube. It will also be noted that the nipple portion 51 is shorter in comparison with the portion 54 than is the case with the nipple portions 20 and 22 for use with rubber hose, thus leaving a considerable portion of the spring 56 overlying a portion of the tubing which is not supported inwardly by the nipple portion 51 to facilitate the desired gripping action by permitting inward deflection of the tubing 52 under the grip of spring 56.

It will thus be seen that the present invention provides simple and effective couplings which are applicable to rubber hose and to copper and aluminum tubing and the like, and which will assure a tight joint capable of withstanding high internal pressures in use. The couplings are also characterized by ease of assembly, since they can be quickly and easily mounted in place without requiring tools other than a simple pair of wrenches or a wrench and vise for use in screwing the nipple and collar portions together, and these couplings are thus particularly advantageous for installation in the field where special tools are unavailable or cannot readily be mounted for use. It will also be noted that the application of these couplings to metal tubing does not require flaring or other preliminary treatment of the tubing, thus further simplifying their assembly and use.

While the forms of apparatus herein described constitute preferred embodiments of the invention, it is to be understood that the invention is not limited to these precise forms of apparatus, and that changes may be made therein without departing from the scope of the invention which is defined in the appended claim.

What is claimed is:

A coupling unit of the character described as adapted for use with a cylindrical metal tube of predetermined dimensions comprising a collar adapted to seat over said tube, a nipple including an inner portion adapted to be received within the end of said tube and a threaded outer portion concentric with said inner portion and adapted to fit over the end of said tube, said collar including a threaded portion for threaded engagement with said threaded portion of said nipple, and a helical spring of uniform cross-sectional shape intermediate its ends adapted to fit over said tube between said collar and nipple for compression axially therebetween when said collar and said nipple are screwed together, said spring being wound in the reverse direction from said threaded portions to effect tightening thereof upon said tube as said collar and nipple are screwed together, and said inner portion of said nipple being of such length as to terminate within said tube at a position closer to the end of said tube than at least a portion of said spring to provide for inward deflection of said tube as said spring is tightened thereon.

References Cited in the file of this patent

UNITED STATES PATENTS

| | | |
|---|---|---|
| 411,829 | Nachtrieb | Oct. 1, 1889 |
| 597,733 | Myers | Jan. 25, 1898 |
| 978,630 | Oettgen | Dec. 13, 1910 |
| 1,542,371 | Canady | June 16, 1925 |
| 1,637,701 | Levitt | Aug. 2, 1927 |
| 1,959,550 | Schnaier | May 22, 1934 |
| 1,977,219 | Williams | Oct. 16, 1934 |
| 2,147,354 | Scholtes | Feb. 14, 1939 |
| 2,251,718 | Parker | Aug. 5, 1941 |
| 2,440,178 | Lofquist | Apr. 20, 1948 |
| 2,452,908 | Cowles | Nov. 2, 1948 |
| 2,525,616 | Peeps | Oct. 10, 1950 |